(12) United States Patent
Wang et al.

(10) Patent No.: US 10,975,519 B2
(45) Date of Patent: Apr. 13, 2021

(54) M+N STEEL CORD FOR REINFORCING RUBBER PRODUCT

(71) Applicant: NV Bekaert SA, Zwevegem (BE)

(72) Inventors: He Wang, Jiangyin (CN); Wei Zhou, Jiangyin (CN); Xiangyu Zhu, Jiangyin (CN); Hongzhen Zhu, Jiangyin (CN)

(73) Assignee: NV BEKAERT SA, Zwevegem (BE)

( * ) Notice: Subject to any disclaimer, the term of this patent is extended or adjusted under 35 U.S.C. 154(b) by 91 days.

(21) Appl. No.: 16/085,300

(22) PCT Filed: Mar. 15, 2017

(86) PCT No.: PCT/EP2017/056050
§ 371 (c)(1),
(2) Date: Sep. 14, 2018

(87) PCT Pub. No.: WO2017/157973
PCT Pub. Date: Sep. 21, 2017

(65) Prior Publication Data
US 2019/0071820 A1    Mar. 7, 2019

(30) Foreign Application Priority Data

Mar. 17, 2016   (WO) ................ PCT/CN2016/076572

(51) Int. Cl.
*D07B 1/06*     (2006.01)
*B60C 9/00*     (2006.01)
*D07B 3/10*     (2006.01)

(52) U.S. Cl.
CPC ............ *D07B 1/062* (2013.01); *B60C 9/0007* (2013.01); *D07B 1/064* (2013.01); *D07B 1/0653* (2013.01);
(Continued)

(58) Field of Classification Search
CPC ...... D07B 1/062; D07B 1/064; D07B 1/0653; D07B 3/106; B60C 9/0007
See application file for complete search history.

(56) References Cited

U.S. PATENT DOCUMENTS 4,022,009 A * 5/1977 van Assendelft ...... D07B 1/062
57/212
4,408,444 A * 10/1983 Baillievier ............. D07B 1/062
57/237
(Continued)

FOREIGN PATENT DOCUMENTS

EP    2 689 939    1/2014
JP    6-73672      3/1994
(Continued)

OTHER PUBLICATIONS

International Search Report dated Jun. 19, 2017 in International Application No. PCT/EP2017/056050.

*Primary Examiner* — Shaun R Hurley
(74) *Attorney, Agent, or Firm* — Wenderoth, Lind & Ponack, L.L.P.

(57) ABSTRACT

A steel cord for rubber reinforcement comprises a first group of core filaments (105) having a number of m and a second group of sheath filaments (110) having a number of n, m is three or four, the core filaments (105) are forming a helix, the core filaments (105) are not twisted together and being substantially parallel or the core filaments (105) have a twist pitch being more than 300 mm; the second group and the first group are twisted with each other, and the sheath filaments (110) are forming a flattened helix in the same direction of the helix of the core filaments (105), and the sheath filaments (110) have a cord twist pitch, at any cross-section of the steel cord, at least one interstice between two adjacent core filaments (105) is present. The steel cord
(Continued)

Figure 1:
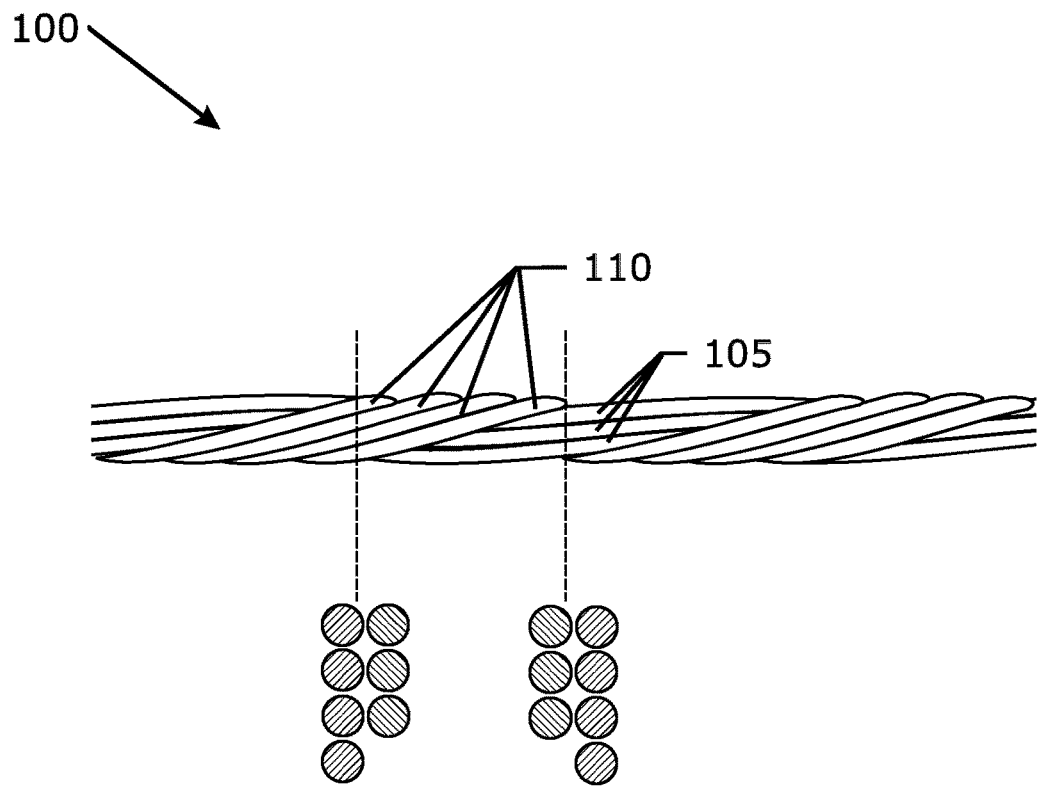

has improved abrasion resistance and can contribute to the reduction of the weight of the tire.

12 Claims, 4 Drawing Sheets

(52) U.S. Cl.
CPC ............ *D07B 3/106* (2013.01); *D07B 1/0626* (2013.01); *D07B 2201/206* (2013.01); *D07B 2201/2011* (2013.01); *D07B 2201/2016* (2013.01); *D07B 2201/2018* (2013.01); *D07B 2201/2019* (2013.01); *D07B 2201/2023* (2013.01); *D07B 2201/2029* (2013.01); *D07B 2201/2052* (2013.01); *D07B 2205/3057* (2013.01); *D07B 2205/3089* (2013.01); *D07B 2207/208* (2013.01); *D07B 2207/4045* (2013.01); *D07B 2401/208* (2013.01)

(56) References Cited

U.S. PATENT DOCUMENTS

| | | | | |
|---|---|---|---|---|
| 4,545,190 | A * | 10/1985 | Rye | D07B 1/0646 57/212 |
| 4,566,261 | A * | 1/1986 | Brandyberry | B60C 9/0057 57/212 |
| 5,285,623 | A * | 2/1994 | Baillievier | D07B 1/062 152/451 |
| 6,089,293 | A * | 7/2000 | Niderost | B29D 30/3028 152/527 |
| 6,109,017 | A * | 8/2000 | Kawatani | B60C 9/0007 152/527 |
| 6,182,433 | B1 * | 2/2001 | Tagawa | D07B 1/062 57/212 |
| 6,354,068 | B1 * | 3/2002 | Onuma | D07B 1/0653 57/211 |
| 6,425,428 | B1 * | 7/2002 | Onuma | B60C 9/0007 152/451 |
| 6,748,731 | B2 | 6/2004 | Kobayashi et al. | |
| 7,051,506 | B2 * | 5/2006 | Kobayashi | D07B 1/0613 57/212 |
| 7,870,715 | B2 * | 1/2011 | Fukuda | D07B 1/062 57/213 |
| 2001/0013385 | A1 * | 8/2001 | Ohya | B60C 9/0007 152/209.18 |
| 2008/0066844 | A1 * | 3/2008 | Obana | B60C 9/0007 152/451 |
| 2014/0000779 | A1 * | 1/2014 | Naoi | B60C 9/0007 152/527 |
| 2016/0101651 | A1 * | 4/2016 | Lee | D07B 5/007 57/219 |
| 2017/0073888 | A1 | 3/2017 | Gallet et al. | |

FOREIGN PATENT DOCUMENTS

| | | |
|---|---|---|
| JP | 8-3886 | 1/1996 |
| JP | 8-27684 | 1/1996 |
| JP | 2001-11782 | 1/2001 |
| JP | 2007-63706 | 3/2007 |
| JP | 2009-287147 | 12/2009 |
| JP | 2010-168670 | 8/2010 |
| WO | 2015/169521 | 11/2015 |

* cited by examiner

M+N STEEL CORD FOR REINFORCING RUBBER PRODUCT

TECHNICAL FIELD

The invention relates to a steel cord for reinforcing rubber product. The invention also relates to a method of producing a steel cord and a tire reinforced by the steel cords.

BACKGROUND ART

To reduce the pollution to the environment, the environmental friendly tire is now desired. One direction is developing lighter weight tire. One of the solutions is reducing the rubber amount of the belt layer of the tire: The thickness of the belt layer is reduced and the weight of the tire is reduced. However, this will make the adjacent belt layers being easily separated, and will lead to the failure of the tire. Another solution is reducing the weight of the steel cords in the tire: The tire reinforced by the lighter steel cord becomes lighter.

Steel cord for reinforcing a rubber product, for example a tire, is always required to have good and even full rubber penetration.

To achieve the above requirements, an m+n flat cord has been developed.

EP2689939 discloses a steel cord with a structure of 2+n, wherein the two core filaments are contacting with each other, and n sheath filament are twisted with the two core filaments, and the core filament has a diameter bigger than the sheath filament.

JP2007063706 discloses a steel cord with a structure of 2+n, n is 1 to 3, wherein the two core filaments are contacting with each other, and n sheath filament are twisted with the two core filaments.

U.S. Pat. No. 6,748,731 discloses a steel cord with a structure of m+n, wherein the core filaments are arranged in side-by-side configuration and no voids are formed between the core filaments.

The steel cords of the above prior arts can help to reduce the weight of the tire and improve the rubber penetration property. However, new solution of steel cord for reducing the tire weight is still desired.

DISCLOSURE OF INVENTION

The primary object of the invention is to provide a steel cord for reducing the weight of the rubber product.

A second object of the invention is to provide a method of making the steel cord for reinforcing the rubber product.

Another object of the invention is to provide a tire with light weight.

Still another object of the invention is to provide a steel cord with a flattened cross-section.

According to a first aspect of the invention, a steel cord is provided, the steel cord comprises a first group of core filaments having a number of m and a second group of sheath filaments having a number of n, m is three or four. The core filaments are forming a helix, while the core filaments are not twisted with each other and are substantially parallel relative to each other or the core filaments have a twist pitch being more than 300 mm. The second group and the first group are twisted with each other, and the sheath filaments are forming a flattened helix in the same direction of the helix formed by core filaments. The sheath filaments have a cord twist pitch. At any cross-section of the steel cord, at least one interstice between two adjacent core filaments is present.

By making an interstice between two adjacent core filaments, the two adjacent core filaments are not always contacting with each other, so the abrasion caused by the contacting of the two adjacent core filaments is avoided. Therefore, the lifetime of the steel cord is improved.

According to the present invention, the core filaments are in a helix configuration, while the core filaments are not twisted with each other and are arranged in substantially parallel relationship or the the core filaments have a twist pitch being more than 300 mm. "Substantially parallel relationship" means the core filaments are arranged one by one, thereby one of the core filaments is positioned left, one of the core filaments is positioned right and the remaining one or two core filaments are in the middle, and "substantially parallel relationship" is a substantially parallel relationship in helical but not in planar.

Possibly the interstice is present between the left and/or right core filament on the one hand and the adjacent core filament in the middle on the other hand, or between the adjacent two core filaments in the middle when the number of core filaments is four.

According to the present invention, the core filaments are arranged substantially parallel. This means that at any cross-section of the steel cord, when drawing a straight line between the central points of the left core filament and the right core filament, the shortest distance between the central points of each remaining core filament and the straight line is less than 0.5 times the diameter of the core filament, thereby to well form and maintain the elongated flat figure of the steel cord.

Preferably, at any cross-section, any two adjacent core filaments are not contacting with each other, in other words, an interstice is present between any two adjacent core filaments, and the number of the interstices is m−1. Thereby the abrasion of the core filaments is reduced, the rubber penetration of the steel cord is enhanced, and the life time of the steel cord is improved.

Preferably, an interstice is measured by the shortest distance L between the adjacent two core filaments at any one cross-section of the steel cord. L is greater than 0 mm and smaller or equal to 0.1 mm. L cannot be too big, otherwise, the core filaments are difficult to be kept in parallel. More preferably, L meets following formula: $0.005 \text{ mm} < L \leq 0.08 \text{ mm}$.

To keep the figure of the core filaments and to obtain high rubber penetration, the number of the sheath filaments n shall not be too big or too small. To make the steel cord with full rubber penetration, n is less than the number which can fully envelop the core filaments. Preferably, n is ranging from two to seven when m is three, or n is ranging from two to eight when m is four. Therefore the preferable structures of the steel cord are 3+2, 3+3, 3+4, 3+5, 3+6, 3+7, 4+2, 4+3, 4+4, 4+5, 4+6, 4+7, 4+8.

The core filaments and the sheath filaments have the same diameter, alternatively, the diameter of the core filament is bigger than the diameter of the sheath filament or the diameter of the core filament is smaller than the diameter of the sheath filament.

According to the present invention, the core filaments are forming a helix, the second group and the first group are twisted with each other, and the sheath filaments are forming a flattened helix in the same direction of the helix formed by the core filaments, as a result, the cross-section of the steel cord mostly looks like a flat or oval shape. When applying the steel cord for reinforcing rubber product, the thickness of the rubber product can be reduced while the same or similar strength can be obtained. Particularly when the tire is reinforced by the steel cord according to the present invention, because the thickness of the rubber product is reduced, the dosage and the weight of the rubber material are reduced, the weight ratio of steel and rubber is improved, thereby the steering stability of the tire is improved, and the weight of the tire is reduced, and also the lifetime of the tire is improved as the abrasion resistance of the steel cord is reduced.

The helix formed by of the core filaments doesn't mean the core filaments are twisted with each other, instead, the core filaments are arranged in substantial parallel, this means at any two cross-sections of the steel cord the alignments of the core filaments are substantial parallel with each other.

JP2001011782 discloses a steel cord consisting of two core filaments and 4-7 sheath filaments, the two core filaments are twisted with each other and thereafter the core filaments can be aligned to be parallel with the long axis of the steel cord or the short axis of the steel cord. There is an interstice between the two core filaments only when the core filaments are aligned to be parallel with the long axis of the steel cord, the interstice is not always presenting between the two core filaments. These are different from the present invention.

The core filaments have a twist pitch being more than 300 mm although the core filaments have a helix configuration. The sheath filaments have a cord twist pitch preferably ranging from 8 to 20 mm so that the sheath filaments are twisted with the core filaments.

Preferably, the core filaments are pre-formed before being twisted with the sheath filaments, thereby easier to obtain the interstice. The preforming could be any type of existing preforming operation known in the art.

In the prior art of making m+n cords, there is the too frequent error of a so-called "crossing" phenomenon: one of the core filaments is crossing against the remaining core filaments. As a result, the sequence of the arrangement of the core filaments is changed. When embedding the steel cord in to rubber to make a rubber ply, the "crossing" phenomenon will cause the thickness of the rubber ply to lack uniformity. The present invention solves this problem in that it reduces the frequency of crossings. According to the invention, the crossing phenomenon is well controlled, and the number of such crossings is less than 20 within 100 cord twist pitches. Preferably, the number of the crossings is less than 10 or even less than 5 within 100 cord twist pitches. As a result, the rubber ply reinforced by the steel cord of the present invention has an improved uniform thickness.

According to the second object of the invention, a method is provided. The method comprises the following steps:
i) providing a first group of core filaments and a second group of sheath filaments;
ii) giving a twist to the first group;
iii) twisting the second group with the first group in a twisting direction opposite to the twist to the first group, thereby to form a m+n steel strand with substantially round cross-section, wherein the core filaments are not twisted with each other or having a twist pitch being more than 300 mm and the sheath filaments having a cord twist pitch;
iii) flattening the steel strand by rollers to form a steel cord.

The flattening force of the roller is well controlled, as a result, the core filaments of the steel cord are arranged in substantially parallel relationship, and the interstice between two adjacent core filaments is present at any cross-section of steel cord. The rollers can be more than one set of rollers, even several or a number of sets of rollers.

Preferably, the method includes a step of providing the core filaments with a preforming operation before step i).

This preforming may comprise giving the core filaments a single crimp, a double crimp or a polygonal preforming. As a result, the interstice between two adjacent core filaments becomes more and more pronounced.

Preferably, before step i) the method includes a process of separating the core filaments, e.g. in a distribution disc, and moulding the core filaments to be in a stable and uniform distribution state, for example substantially regular triangle or square form, for example in a compressing die. The result is that the crossing problem is quite reduced in the final steel cord.

The invention steel cord can be used for reinforcing rubber product, like tire.

According to the third object of the invention, a tire with light weight is provided, wherein the belt layer of the tire is reinforced by the steel cords according to the first object of the invention. The tire could be any tire with existing type, like passenger car tire and truck tire. The tire has an improved abrasion resistance and longer life time. Further the dosage of the rubber material can be reduced because of the application of the steel cord according to the present invention, thereby the tire has a reduced weight. Additionally the tire has an improved steering stability and good rubber penetration.

BRIEF DESCRIPTION OF FIGURES IN THE DRAWINGS

Figure 2:
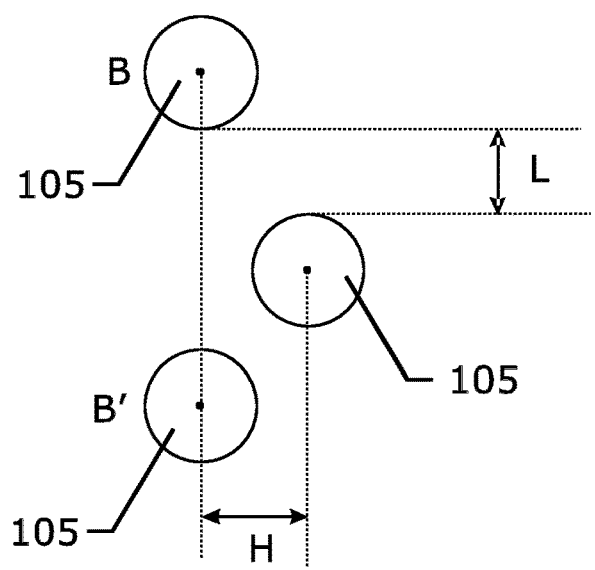
Figure 3:
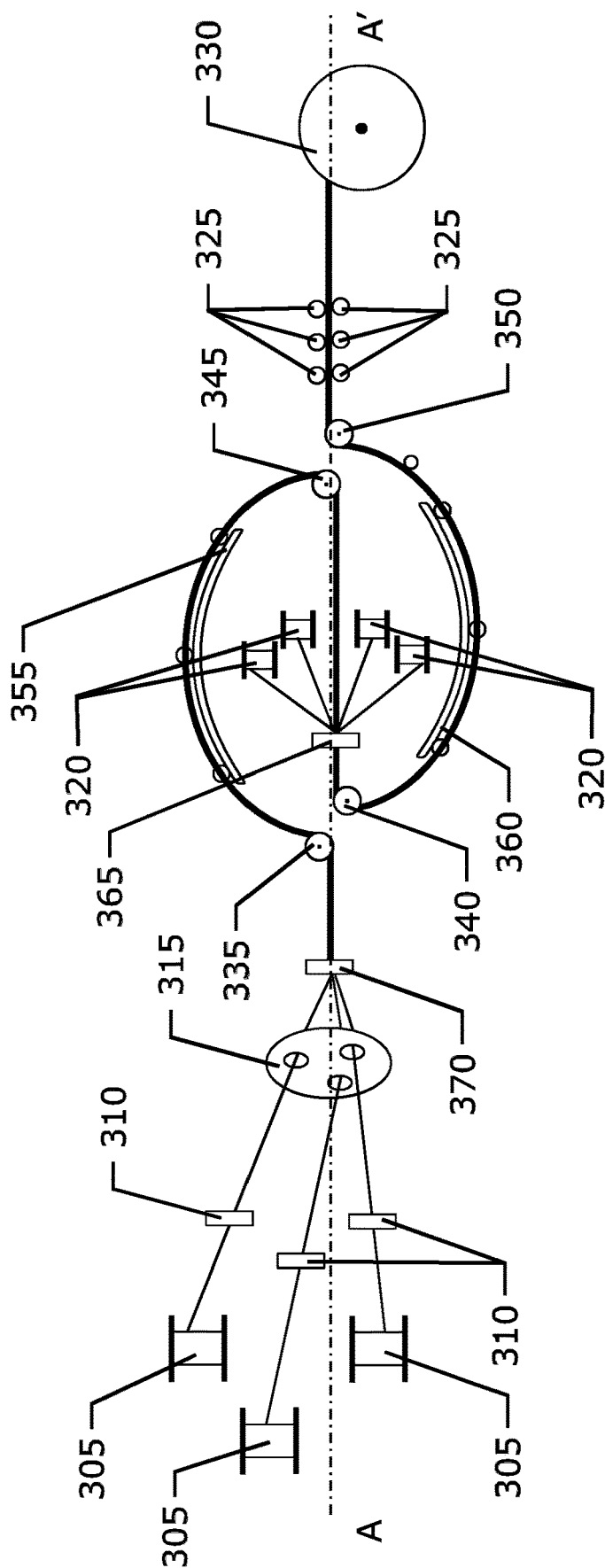
Figure 4:
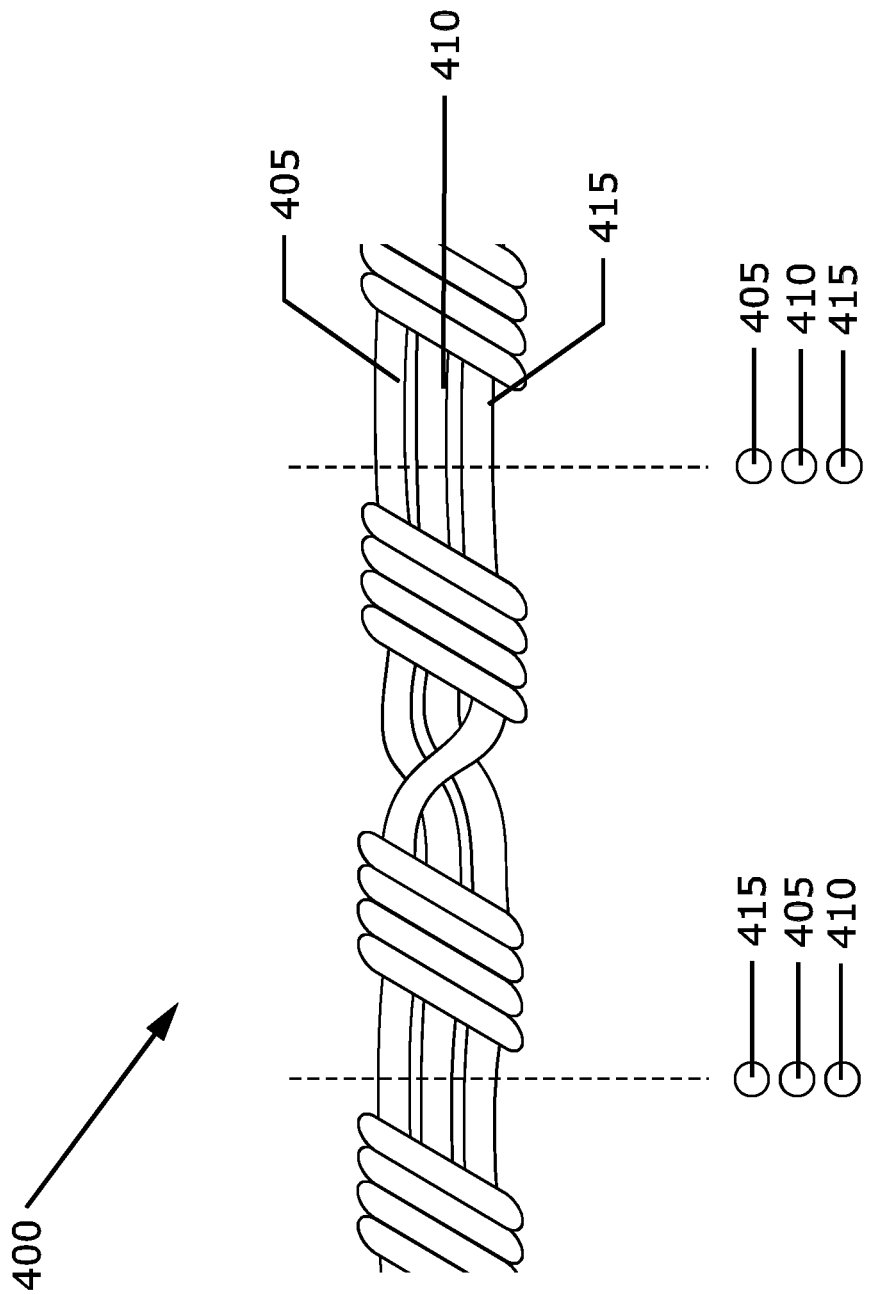
Figure 5:
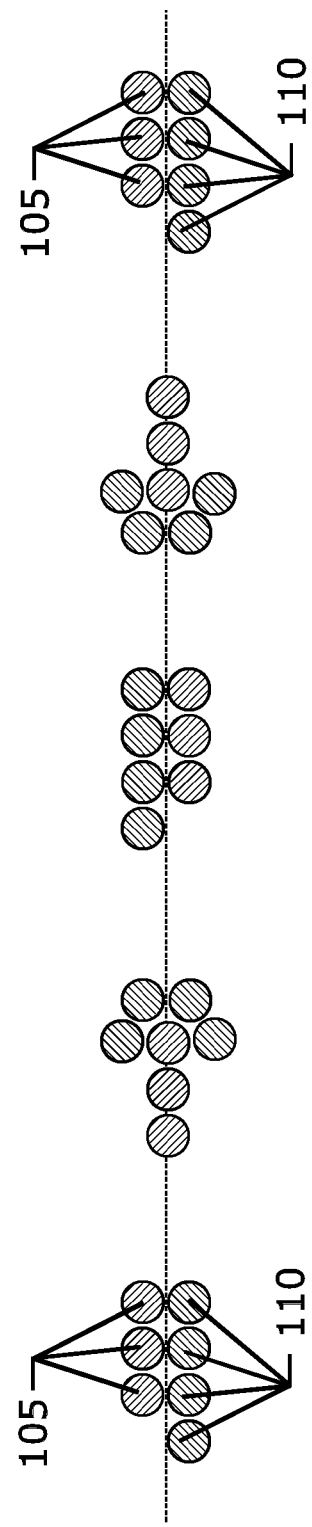

FIG. 1 describes a steel cord according to the invention.
FIG. 2 describes a steel cord according to the invention.
FIG. 3 describe an apparatus for manufacturing the steel cord according to the invention.
FIG. 4 describe the "crossing" phenomenon of the steel cord according to the invention.
FIG. 5 describes the alignment of the core filaments at some cross-sections within an axial length of one twist.

MODE(S) FOR CARRYING OUT THE INVENTION

The steel filament for steel cord is made from a wire rod.
The wire rod is firstly cleaned by mechanical descaling and/or by chemical pickling in a $H_2SO_4$ or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter d1, e.g. at about 3.0 to 3.5 mm, the dry drawn steel wire is subjected to a first intermediate heat treatment, called patenting. Patenting means first austenitizing until a temperature of about 1000° C. followed by a transformation phase from austenite to pearlite at a temperature of about 600-650° C. The steel wire is then ready for further mechanical deformation.

Thereafter the steel wire is further dry drawn from the first intermediate diameter d1 until a second intermediate diameter d2 in a second number of diameter reduction steps. The second diameter d2 typically ranges from 1.0 mm to 2.5 mm.

At this second intermediate diameter d2, the steel wire is subjected to a second patenting treatment, i.e. austenitizing again at a temperature of about 1000° C. and thereafter quenching at a temperature of 600 to 650° C. to allow for transformation to pearlite.

If the total reduction in the first and second dry drawing step is not too big a direct drawing operation can be done from wire rod till diameter d2.

After this second patenting treatment the steel wire is usually provided with a brass coating: copper is plated on the steel wire and zinc is plated on the copper. A thermo-diffusion treatment is applied to form the brass coating.

The brass-coated steel wire is then subjected to a final series of cross-section reductions by means of wet drawing machines. The final product is a steel filament with a carbon content above 0.60 percent by weight, e.g. higher than 0.70 percent by weight, or higher than 0.80 percent by weight, or even higher than 0.90 percent by weight, with a tensile strength typically above 2000 MPa, e.g. above 4080-2000d MPa or above 4400-2000d MPa (d is the diameter of the steel filament) and adapted for the reinforcement of elastomer products.

Steel filaments adapted for the reinforcement of tyres typically have filaments with a final diameter ranging from 0.05 mm to 0.60 mm, e.g. from 0.10 mm to 0.40 mm. Examples of filament diameters are 0.10 mm, 0.12 mm, 0.15 mm, 0.175 mm, 0.18 mm, 0.20 mm, 0.22 mm, 0.245 mm, 0.28 mm, 0.30 mm, 0.32 mm, 0.35 mm, 0.38 mm, 0.40 mm.

Then the steel filaments are subjected to a process to form a steel cord.

FIG. 3 shows an apparatus for making a steel cord from steel filaments. The apparatus comprises a rotating part and fixed parts. The rotating part is rotating in the same sense and at the same angular speed around the axis A-A'. The rotating part is located in a cradle which is not shown in FIG. 3 but well known in the art. The fixed parts are other parts besides the rotating part. The rotating part includes the guiding wheels 335, 340, 345, 350, rotating strand guides 355, 360 and a bundling die 365. Inside the rotating part, a number of bobbin holders (not shown) with the respective bobbins 320 are provides, the number of the bobbins 320 inside the rotating part is the same as the number of the sheath filaments. Outside the rotating part, the apparatus comprises a number of bobbin holders (not shown) with the respective bobbins 305 (the number of the bobbins 305 is the same as the number of the core filaments), a serious of rollers 325 and a take-up reel 330. Preferably the apparatus further comprises a number of preforming devices 310, a filament distribution disk 315 and a compressing die 370.

The core filaments (three core filaments as an example) paid-off from the bobbins 305 are guided into the rotating part. Preferably, before entering into the rotating part, the core filaments are guided through the preforming devices 310 to obtain a preforming operation, and/or then through the distribution disk 315 and the compressing die 370 to be distributed uniformly and moulded in a stable distribution form, for example substantially regular triangle form. Then the core filaments are guided through the guiding wheel 335 and further over the rotating strand guide 355 towards the guiding wheel 345, thereafter the core filaments are twisted together in a S-direction and with a twice cord twist pitch. Over the guiding wheel 345, the going direction of the core filaments is reversed, to be towards the guiding wheel 340. The core filaments then are guided through the bundling die 365, in the bundling die 365 the core filaments receive the sheath filaments (four sheath filaments as an example) which are paid-off from the bobbins 320, thereby to form a strand with substantially round cross-section. The strand comprising core filaments and sheath filaments is guided over the guiding wheel 340 and is reversed its going direction. The core filaments leaving the guiding wheel 340 still have a twist in S-direction and a same twice cord twist pitch, for example 16 mm. The sheath filaments have a twist in Z-direction and a twice cord twist pitch. The strand leaving the guiding wheel 340 comprises the core filaments twisted in the S-direction and the sheath filaments twisted in the Z-direction, and it further is guided over the rotating strand guide 360 and guide wheel 350 towards the series of rollers 325, thereafter, the core filaments are untwisted and are in substantially parallel or the core filaments have a twist pitch being more than 300 mm, the sheath filaments are twisted in Z-direction with a cord twist pitch, for example 8 mm. The strand leaving the guide wheel 350 is flattened by the series of rollers 325, thereafter, the cross-section of the strand is no longer substantially round but mostly looks like a flat or oval shape, thereafter, a steel cord of the present invention is formed. Finally, the steel cord is wound on the take-up reel 330.

FIG. 1 shows the steel cord according to the invention, including the front view and the cross-sectional view. The steel cord 100 comprises three core filaments 105 and four sheath filaments 110. By detecting the cross-section of the different place along the length of the steel cord 100, it is clear that the adjacent two of core filaments 105 have interstice in between, and the core filaments 105 are substantially parallel and in a substantially straight line. FIG. 2 shows the method of measuring the shortest distance L between the adjacent two core filaments 105: the shortest distance L being the shortest distance between the surface of the two adjacent core filaments 105 is 0.04 mm; and the method of measuring whether the core filaments 105 are substantially parallel and in a substantially straight line: draw a straight line B-B' between the central points of two core filaments 105 located in two sides at one cross-section of the steel cord, the shortest distance H between the central points of the rest core filament 105 and the straight line B-B' is 0.08 mm when the diameter of the core filament 105 is 0.23 mm.

FIG. 4 shows the "crossing" phenomenon. Along the length of the steel cord 400, one core filament 415 changes its location and goes cross the remaining core filaments 405, 410. As a result, the sequence of the arrangement of the core filaments 405, 410, 415 is changed, from the top-down direction of the cross-section of the core filaments, 415-405-410 is changed to be 405-410-415.

Another embodiment of the present invention is 4+3. The steel filaments of the steel cord have a diameter of 0.35 mm. The interstice between the core filaments is less than 0.08 mm. The rubber penetration of the steel cord is 100% (by air drop test).

A third embodiment of the present invention is 4+5. The steel filaments of the steel cord have a diameter of 0.35 mm. The interstice between the core filaments is less than 0.07 mm. The rubber penetration of the steel cord is 100%.

A fourth embodiment of the present invention is 3+2. The core filaments of the steel cord have a diameter of 0.18 mm, and the sheath filaments of the steel cord have a diameter of 0.30 mm. The interstice between the core filaments is 0.05 mm. The rubber penetration of the steel cord is 100%.

Some other embodiments are 3+2 steel cord, wherein the core filaments and the sheath filaments have a diameter of 0.23 mm, 0.28 mm or 0.30 mm; or 3+5 steel cord, wherein the core filaments and the sheath filaments have a diameter of 0.32 mm; or 3+5 steel cord, wherein the core filaments have a diameter of 0.35 mm and the sheath filaments have a diameter of 0.32 mm. All of the steel cords above have at least one interstice presenting between two adjacent core filaments, and have a rubber penetration being 100%.

FIG. 5 illustrates the alignment of the core filaments at some cross-sections within an axial length of one twist. It is clear that the alignments of the core filaments 105 at all cross-sections are substantially parallel with each other, and the core filaments 105 are not twisted with each other. The core filaments 105 are forming a helix, and the sheath filaments 110 are twisted with the core filaments 105 and thereby forming a flattened helix in the same direction of the helix of the core filaments 105.

The invention claimed is:

1. A steel cord for rubber reinforcement, the steel cord comprising a first group of core filaments and a second group of sheath filaments being twisted with each other,
    the first group of core filaments having a number of m core filaments,
    wherein m is three or four,
    wherein the first group of core filaments collectively forms a helix,
    wherein the individual core filaments from the first group do not cross over each other, and
    wherein the core filaments are substantially parallel or have a twist pitch of more than 300 mm, the second group of sheath filaments having a number of n sheath filaments,
    wherein the second group of sheath filaments forms a flattened helix in the same direction of the helix of the core filaments, the sheath filaments having a cord twist pitch,
    wherein, at every cross-section of the steel cord, at least one interstice between two adjacent core filaments is present, and
    wherein said interstice is measured by the shortest distance L between said adjacent two core filaments, L being greater than 0 mm and smaller or equal to 0.1 mm.

2. The steel cord as claimed in claim 1, wherein said L satisfies: $0.005\ mm < L \leq 0.08\ mm$.

3. The steel cord as claimed in claim 1, wherein the number of said interstices is m−1.

4. The steel cord as claimed in claim 1, wherein said n is ranging from two to seven when said m is three, or said n is ranging from two to eight when said m is four.

5. The steel cord as claimed in claim 1, wherein said cord twist pitch is ranging from 8 mm to 20 mm.

6. The steel cord as claimed in claim 1, wherein said core filaments are pre-formed before being twisted with said sheath filaments.

7. The steel cord as claimed in claim 1, wherein said core filaments are arranged in substantially parallel, meaning when drawing a straight line between the central points of the left core filament and the right core filament in a cross-section, the shortest distance between the central points of each remaining core filament and said straight line is less than 0.5 times the diameter of said core filament.

8. A method of making a steel cord as claimed in claim 1, the method comprising the following steps:
    i) providing a first group of core filaments and a second group of sheath filaments;
    ii) giving a twist to said first group;
    iii) twisting said second group with said first group in a twisting direction opposite to said twist to said first group, thereby to form a m+n steel strand with substantially round cross-section, the core filaments being untwisted with each other or having a twist pitch being more than 300 mm and the sheath filaments have a cord twist pitch;
    iv) flattening said steel strand by rollers to form said steel cord.

9. The method of making a steel cord as claimed in claim 8, wherein said core filaments are preformed before step i).

10. The method of making a steel cord as claimed in claim 8, wherein said core filaments are uniformly separated between step i) and step ii).

11. A use of a steel cord as claimed in claim 1 for reinforcing tire.

12. A tire, wherein the belt layer of said tire is reinforced by steel cords as claimed in claim 1.

\* \* \* \* \*